(12) United States Patent
Goncalves et al.

(10) Patent No.: US 8,720,325 B2
(45) Date of Patent: *May 13, 2014

(54) FOOD PROCESSOR WITH A LOCKABLE ADJUSTABLE BLADE ASSEMBLY

(75) Inventors: Joao Paulo M. Goncalves, Midland, MI (US); Alex R. Oliveira, Lauro de Freitas (BR); Fernando R. Oliveira, Lauro de Freitas (BR); Eric G. Tauzer, Charlevoix, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 985 days.

This patent is subject to a terminal disclaimer.

(21) Appl. No.: 12/769,746

(22) Filed: Apr. 29, 2010

(65) Prior Publication Data

US 2011/0265665 A1 Nov. 3, 2011

(51) Int. Cl.
*A47J 23/00* (2006.01)

(52) U.S. Cl.
USPC .......................................................... 99/538

(58) Field of Classification Search
CPC ...................................................... A21B 7/005
USPC ............. 99/538, 537, 348; 241/92, 100, 286, 241/277, 282.1, 282.2, 37.5, 278.1; 83/932, 83/168, 857, 666, 676

See application file for complete search history.

(56) References Cited

U.S. PATENT DOCUMENTS

| | | | |
|---|---|---|---|
| 1,489,695 A * | 4/1924 | Burns et al. | 241/101.3 |
| 2,189,199 A | 2/1940 | Criner | |
| 3,199,860 A | 8/1965 | Moberg | |
| 3,623,525 A | 11/1971 | Kieves | |
| 4,190,208 A | 2/1980 | Schaeffer et al. | |
| 4,283,979 A | 8/1981 | Rakocy et al. | |

(Continued)

FOREIGN PATENT DOCUMENTS

| DE | 3644267 A1 | 7/1988 |
|---|---|---|
| EP | 0100755 A2 | 2/1984 |

(Continued)

OTHER PUBLICATIONS

Extended European Search Report. Application No. 11163932.4, filing date Apr. 27, 2011, priority claim to U.S. Appl. No. 12/469,746.

(Continued)

*Primary Examiner* — Henry Yuen
*Assistant Examiner* — Phuong Nguyen

(57) ABSTRACT

A food processor includes a bowl with a removable lid. Food items are advanced into the bowl through a feed tube formed in the lid where they are cut by a blade assembly. A rotating disk is adjustable relative to the blade assembly to vary the thickness of the food items cut by the blade assembly. A user-operated pin is positioned below the rotating disk and is moveable between a first position in which the rotating disk is prevented from moving upwardly and downwardly, and a second position in which the rotating disk is permitted to move upwardly and downwardly.

10 Claims, 8 Drawing Sheets

(56) References Cited

U.S. PATENT DOCUMENTS

| | | |
|---|---|---|
| 4,364,525 A | 12/1982 | McClean |
| 4,560,111 A | 12/1985 | Cavalli |
| 4,877,191 A * | 10/1989 | Golob et al. .................... 241/92 |
| 5,046,252 A | 9/1991 | Ayuta et al. |
| 7,322,112 B2 | 1/2008 | Boerner |
| 2008/0156913 A1 | 7/2008 | Orent |
| 2009/0314168 A1 | 12/2009 | Krasznai |

FOREIGN PATENT DOCUMENTS

| | | |
|---|---|---|
| FR | 2582497 | 12/1986 |
| FR | 2862199 A1 | 5/2005 |
| WO | 03057355 A1 | 7/2003 |
| WO | 2009/076585 A1 | 6/2009 |

OTHER PUBLICATIONS

Extended European Search Report. Application No. 11163931.6, filed Apr. 27, 2011, priority claim to U.S. Appl. No. 12/769,709.
Wolfgang Puck Professional Series 12-Cup Food Processor Use and Care, Jul. 3, 2007, p. 1-23, W. P. Appliances, Inc. Model WPMFP20C, Rev 1.0, Downloaded From TSCDIST_Foodprocmanual on Apr. 12, 2010.

* cited by examiner

FOOD PROCESSOR WITH A LOCKABLE ADJUSTABLE BLADE ASSEMBLY

CROSS-REFERENCE TO RELATED U.S. PATENT APPLICATIONS

Cross-reference is made to co-pending U.S. Utility patent application Ser. No. 12/769,709 entitled "Food Processor With Cutting Blade Assembly Support," filed on Apr. 29, 2010, and U.S. Utility patent application Ser. No. 12/769,796 entitled "Adjustable Food Processor With Guide Ramp," filed Apr. 29, 2010, each of which is assigned to the same assignee as the present application, each of which is filed concurrently herewith, and each of which is hereby incorporated by reference.

TECHNICAL FIELD

The present disclosure relates generally to a domestic food processor, and more particularly to a food processor having a control for adjusting the cutting thickness of the food processor.

BACKGROUND

A food processor is a motorized domestic appliance for manipulating (e.g., chopping, slicing, dicing, shredding, grating, or blending) food items. Such an appliance includes a bowl with a removable lid. Food items are inserted into the bowl through a feed tube formed in the lid where they are cut by motor-driven cutting tool.

Food processors typically come equipped with a number of interchangeable cutting tools for slicing, shredding, or other food processing operations. One common cutting tool is a rotating disk-type cutter. Such a cutting tool includes a rotating disk having a cutting blade fixed thereto. The cutting blade is secured to the rotating disk at a location adjacent to an aperture formed in the disk so that pieces of food cut by the blade fall through the aperture and collect in the bottom of the bowl.

SUMMARY

According to one aspect of this disclosure, a food processor includes a base having a motor positioned therein, a removable bowl coupled to the base, and a removable lid coupled to the bowl. The lid has a feed tube that opens into the bowl. A cutting blade is positioned in the bowl and driven by the motor to cut food items advanced through the feed tube. The food processor also includes a rotating disk upwardly and downwardly moveable relative to the cutting blade to adjust the distance therebetween, and a user-operated pin positioned below the rotating disk. The user-operated pin is moveable between a first position in which the rotating disk is prevented from moving upwardly and downwardly relative to the cutting blade, and a second position in which the rotating disk is permitted to move upwardly and downwardly relative to the cutting blade. In some embodiments, the rotating disk may include a sleeve extending downwardly from a lower surface thereof, and the cutting blade may be coupled to a central shaft positioned in the sleeve of the rotating disk.

In some embodiments, the user-operated pin may include a pin body extending from a first end through a sidewall of the sleeve to a second end received in an aperture formed in the central shaft. In some embodiments, the sidewall of the sleeve may include a first plurality of teeth, an outer surface of the pin body may have a second plurality of teeth extending therefrom, and a number of the first plurality of teeth may be engaged with the second plurality of teeth when the user-operated pin is in the first position.

Additionally, in some embodiments, the first plurality of teeth may be spaced apart from the second plurality of teeth when the user-operated pin is moved to the second position. In some embodiments, the food processor may also include a spring having a first spring end positioned at a bottom of the aperture of the central shaft and a second spring end coupled to the second end of the user-operated pin. The spring may bias the user-operated pin in the first position. In some embodiments, a guide pin may extend outwardly from the bottom of the aperture, and the spring may extend over the guide pin.

In some embodiments, the food processor may also include a lever pivotably coupled to a sidewall of the sleeve and may have a first lever end contacting the second end of the user-operated pin. Movement of the user-operated pin between the first position and the second position may cause the lever to pivot about an axis between a first lever position and a second lever position. In some embodiments, the lever may extend from the first lever end to a second lever end. The second lever end may be coupled with the central shaft when the lever is at the first lever position. In some embodiments, the central shaft may have an outer surface with a plurality of teeth extending therefrom, and the second lever end may be engaged with a number of the plurality of teeth when the lever is at the first lever position, thereby preventing the rotating disk from moving relative to the cutting blade.

In some embodiments, the second lever end may be spaced apart from the plurality of teeth at the second lever position, thereby permitting movement of the rotating disk relative to the cutting blade. In some embodiments, the food processor may also include a spring having a first end coupled to a sidewall of the sleeve and a second end coupled to the second lever end. The spring may bias the lever in the first lever position, thereby maintaining the user-operated pin in the first position and preventing movement of the rotating disk relative to the cutting blade. Additionally, in some embodiments, a button may be secured to a first end of the user-operated pin, and depressing the button moves the user-operated pin from the first position to the second position.

According to another aspect, a food slicer assembly for a food processor is disclosed. The food slicer assembly includes a cutting blade, a rotating disk upwardly and downwardly movable relative to the cutting blade to adjust the distance therebetween, and a locking mechanism positioned below a lower surface of the rotating disk. The locking mechanism includes a user-operated pin that is moveable between a first position in which the locking mechanism prevents the rotating disk from moving upwardly and downwardly relative to the cutting blade, and a second position in which the locking mechanism permits the rotating disk to move upwardly and downwardly relative to the cutting blade.

In some embodiments, the food slicer assembly may further include a sleeve extending downwardly from the lower surface of the rotating disk, and a central shaft positioned in the sleeve. The central shaft may have the cutting blade coupled thereto. In some embodiments, the locking mechanism may include a first plurality of teeth extending from a sidewall of the sleeve. The user-operated pin may extend through the sleeve into the central shaft and may have a second plurality of teeth extending therefrom. The second plurality of teeth may be engaged with a number of the first plurality of teeth when the user-operated pin is in the first position and spaced apart from the first plurality of teeth when the user-operated pin is moved to the second position.

In some embodiments, the locking mechanism may include a plurality of teeth extending from the central shaft, and a lever extending from a first end coupled to the user-operated pin to a second end. The second end of the lever may be engaged with a number of the teeth when the user-operated pin is in the first position and spaced apart from the plurality of teeth when the user-operated pin is in the second position. In some embodiments, the lever may be pivotably coupled to the sleeve.

According to another aspect, the food processor includes a base having a motor positioned therein, a removable bowl coupled to the base, a cutting blade positioned in the bowl and secured to a central shaft driven by the motor, and a rotating disk having the central shaft extending therethrough. The rotating disk is upwardly and downwardly moveable between a plurality of positions relative to the cutting blade. The food processor also includes a locking mechanism positioned below a lower surface of the rotating disk. The locking mechanism includes a user-operated pin extending through the rotating disk that is moveable between a first position in which the rotating disk is prevented from moving upwardly and downwardly relative to the cutting blade, and a second position in which the rotating disk is permitted to move upwardly and downwardly relative to the cutting blade.

In some embodiments, the locking mechanism may include a first plurality of teeth extending from a sidewall of the rotating disk, and the user-operated pin may have a second plurality of teeth extending therefrom. The second plurality of teeth may be engaged with a number of the first plurality of teeth when user-operated pin is in the first position and spaced apart from the first plurality of teeth when the user-operated pin is moved to the second position.

BRIEF DESCRIPTION OF THE DRAWINGS

The detailed description particularly refers to the following figures, in which.

DETAILED DESCRIPTION OF THE DRAWINGS

Figure 1:
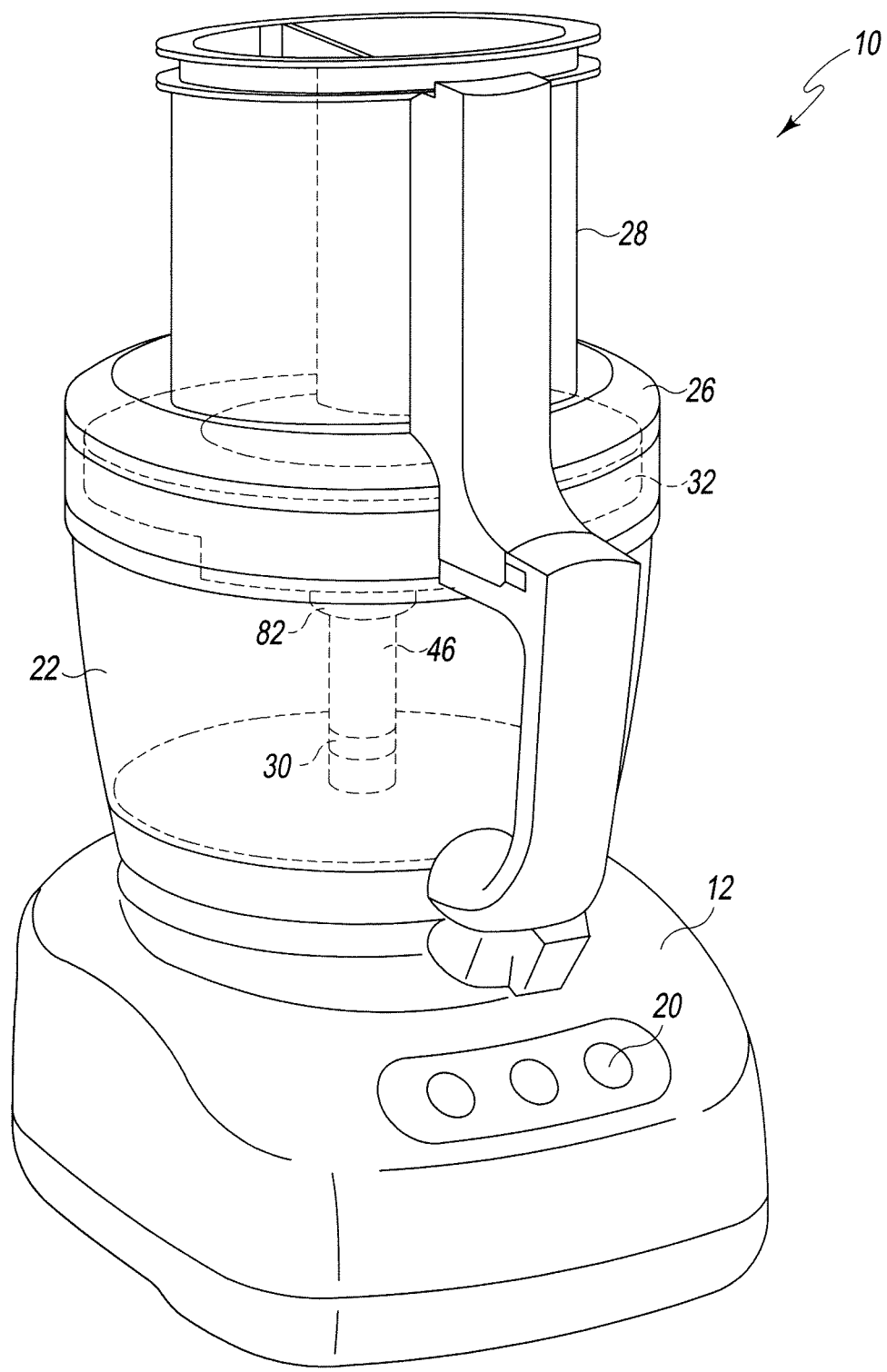
FIG. 1 is a perspective view of a food processor.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIGS. 1-6, a food processor 10 is shown. One example of a food processor is the KitchenAid® 12-Cup Ultra Wide Mouth™ Food Processor, Base Model No. KFPW760OB, which is commercially available from Whirlpool Corporation of Benton Harbor, Mich., U.S.A. The food processor 10 has a base 12 that houses a motor 14 (shown schematically in FIG. 2) and a control unit (not shown). Under the control of the control unit, the motor's output shaft 16 drives a cutting blade 18 (see FIG. 2) to cut food items such as cheeses, meats, fruits, and vegetables. The base 12 also includes one or more buttons, switches, dials, or other types of controls 20. A user operates the controls 20 to control the operation of the motor 14 and hence the food processor 10. For instance, one of the controls 20 may be operable to turn the motor 14 on and off, while another control 20 may change the motor's speed.

As will be understood by those skilled in the art, the control unit may comprise analog and/or digital circuitry to process electrical signals received from the motor 14 (or other components of the food processor 10) and provide electrical control signals to the motor or other components of the food processor 10. For example, the control unit may be embodied as a microcontroller that executes firmware routines to control the operation of the food processor 10.

A removable bowl 22 is secured to the base 12. The bowl's handle facilitates placement of the bowl 22 on the base 12. The bowl 22 includes a removable lid 26 secured to its upper peripheral edge. The lid 26 has a feed tube 28 formed thereon through which food items such as cheeses, meats, fruits, and vegetables are inserted into the bowl 22 to be processed by the food processor 10. Collectively, the lid 26 and the bowl 22 define a processing chamber 24 where food items are processed by the cutting blade 18.

The bowl 22, lid 26, and feed tube 28 are generally made of a transparent or translucent plastic material, so that the contents of the food processor 10 can be viewed by a user without removing the lid 26 from the bowl 22. Moreover, one or more locking mechanisms may be used to lock the bowl to the base 12 and the lid 26 to the bowl 22.

Figure 2:
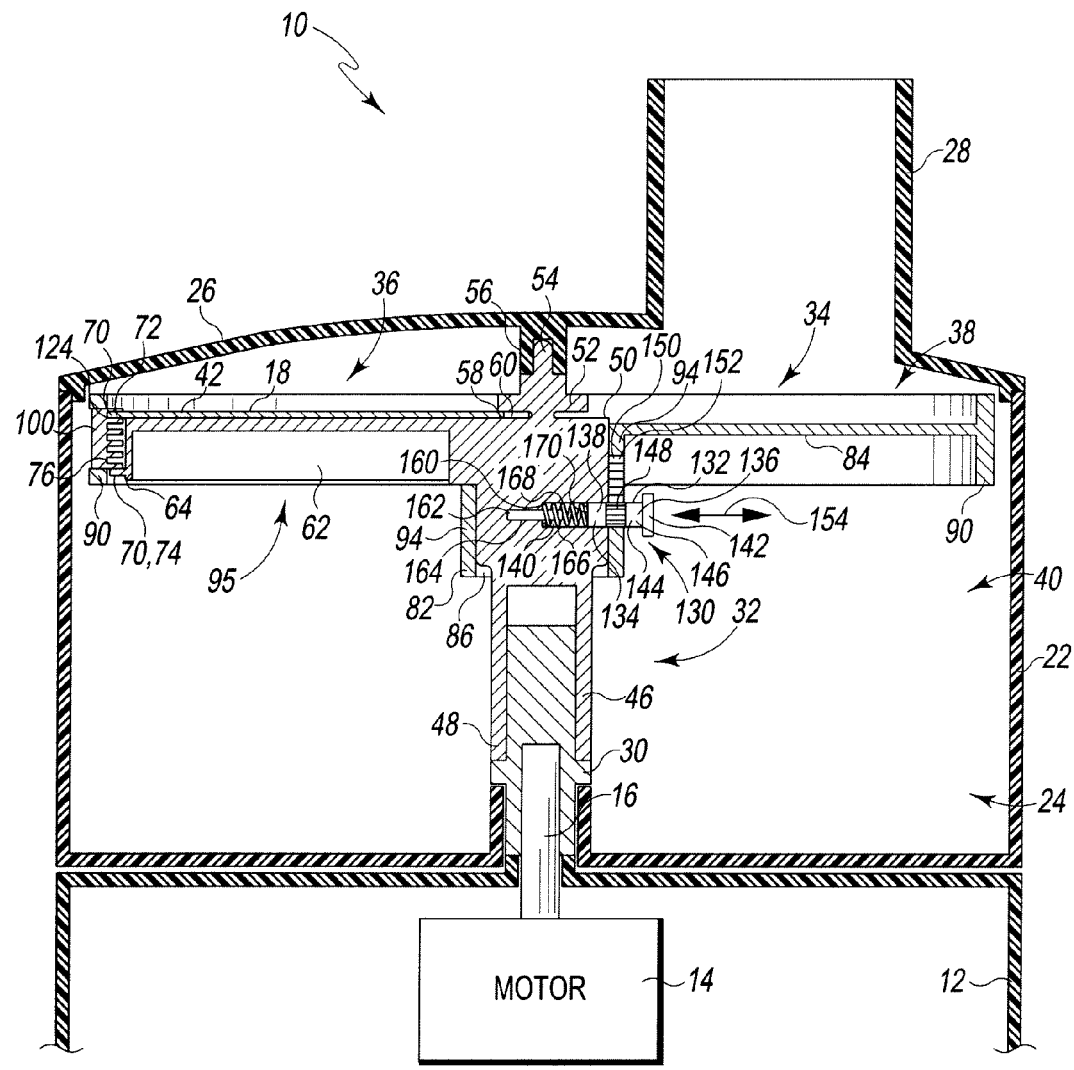
FIG. 2 is a partial cross sectional view of the food processor of FIG. 1.
Figure 3:
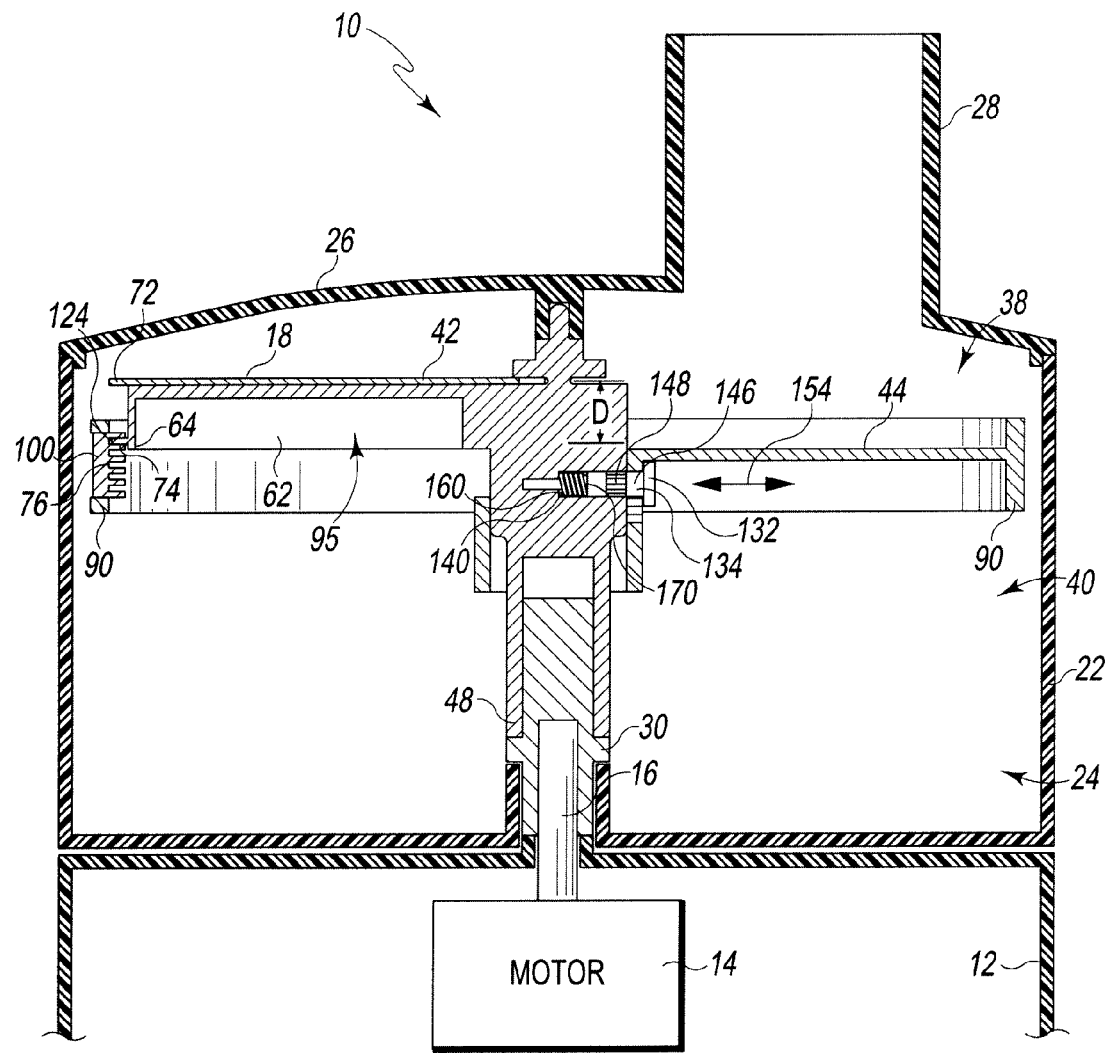
FIG. 3 is a view similar to FIG. 2, showing the rotating disk of the food slicer assembly of FIG. 2 in another position relative to the cutting blade.
Figure 4:
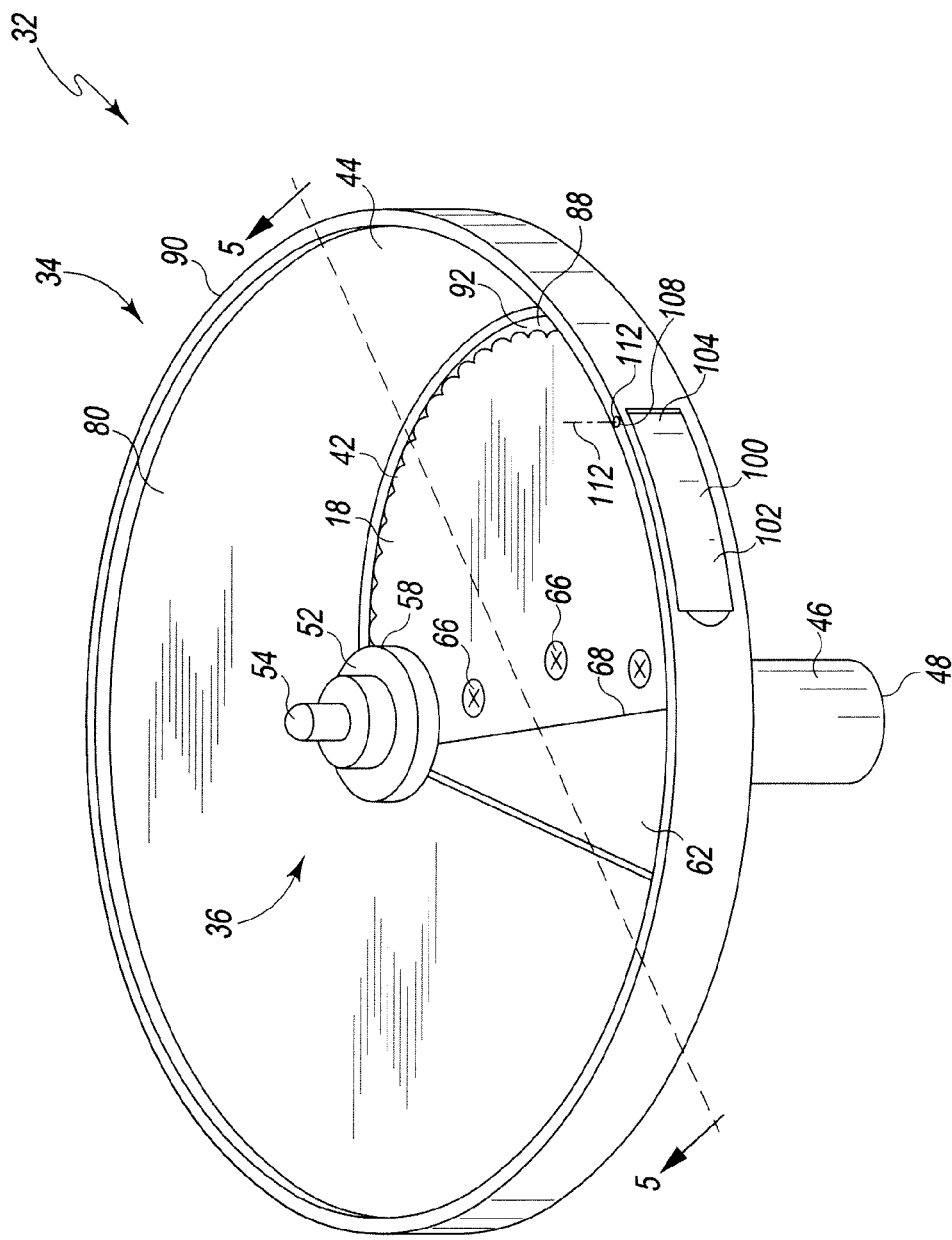
FIG. 4 is a perspective view of the food slicer assembly of FIG. 2.

As shown in FIGS. 2 and 3, when the removable bowl 22 is secured to the base 12, the output shaft 16 of the motor 14 is coupled to a drive stem 30. The drive stem 30 is in turn coupled to a food slicer assembly 32. As shown in FIGS. 2-4, the food slicer assembly 32 includes a rotating disk 34 and a blade assembly 36, with the cutting blade 18 being one component thereof. The rotating disk 34 effectively divides the processing chamber 24 into an upper compartment 38 located between the disk 34 and the lid 26, and a lower compartment 40 located below the rotating disk 34. A vertical distance, D, between the cutting edge 42 of the cutting blade 18 and the upper surface 44 of the rotating disk 34 defines a cutting thickness. In other words, the thickness of the pieces of food items cut by the food processor 10 is determined by the distance D between the cutting edge 42 of the cutting blade 18 and the upper surface 44 of the rotating disk 34. When the distance D between the cutting edge 42 of the cutting blade 18 and the upper surface 44 of the rotating disk 34 is increased, thicker pieces of food items are created, with thinner pieces of food items being created when the distance D between the cutting edge 42 of the cutting blade 18 and the upper surface 44 of the rotating disk 34 is decreased. As will be discussed in greater detail below, the rotating disk 34 is moveable upwardly or downwardly between a plurality of cutting positions relative to the cutting blade 18 to vary the cutting thickness of the food processor 10, thereby creating thicker or thinner pieces of cut food items.

As shown in FIGS. 2-5, the blade assembly 36 includes a central shaft 46 that extends from a lower end 48 to an upper end 50. The lower end 48 receives the drive stem 30, thereby coupling the slicer assembly 32 to the output shaft 16 such that the slicer assembly 32 may be driven by the motor 14. The blade assembly 36 also includes a hub 52 positioned at the upper end 50 of the central shaft 46. As shown in FIG. 2, a tip 54 of the hub 52 is received in a guide sleeve 56 extending downward from the underside of the lid 26.

An inner edge 58 of the cutting blade 18 is received in a slot 60 formed between the hub 52 and the upper end 50 of the central shaft 46. As shown in FIGS. 2 and 3, the cutting blade 18 is secured within the slot 60 such that substantial deflection of the cutting blade 18 is inhibited when the cutting blade 18 cuts food items in the processing chamber 24. The cutting blade 18 is also secured to a mounting arm 62 extending away from the upper end 50 of the central shaft 46 to an end 64. A number of fasteners 66 (i.e., screws) positioned at a rear edge 68 of the cutting blade 18 extend into the mounting arm 62, thereby rigidly securing the cutting blade 18 to the mounting arm 62. It will be appreciated that in other embodiments the fasteners 66 may take the form of T-stakes, pins, posts, or other structures capable of securing the cutting blade 18 to the mounting arm 62. Additionally, the mounting arm 62 may include an overmold that receives the cutting blade 18.

As shown in FIGS. 2 and 3, the blade assembly 36 also includes a pair of flanges 70 extending beyond the end 64 of the mounting arm 62. One of the flanges 70 is an outer edge 72 of the cutting blade 18. Another flange 70 is an arcuate-shaped lip 74 extending outwardly from the end 64 of the mounting arm 62 that is parallel to the outer edge 72 of the cutting blade 18. As will be discussed in greater detail below, at least one of the flanges 70 is received in one of a plurality of slots 76 formed in the rotating disk 34 at each of the cutting positions.

The rotating disk 34 includes a planar body 80 and a central sleeve 82 extending downwardly from a lower surface 84 thereof. It will be appreciated that one or more of the components of the rotating disk 34 may be formed from plastic or a metallic material. The rotating disk 34 includes a passageway 86 that extends through the sleeve 82 and receives the central shaft 46 of the blade assembly 36. The planar body 80 also has a contoured opening 88 extending from the upper surface 44 to the lower surface 84. The contoured opening 88 is sized to receive the mounting arm 62 of the blade assembly 36. When the blade assembly 36 is positioned in the rotating disk 34, a gap or throat 92 is defined between the cutting edge 42 and the body 80, as shown in FIG. 4.

During operation, the motor 14 causes the blade assembly 36 to rotate. The blade assembly 36 acts on a sidewall 94 of the sleeve 82 such that the rotating disk 34 and the blade assembly 36 rotate together. Food items inserted through the feed tube 28 are urged into contact with the upper surface 44 of the rotating disk 34 while being acted upon (i.e., cut) by the cutting blade 18. Cut food items, along with other food items small enough to fit within the throat 92, pass from the upper compartment 38 into the lower compartment 40 through the throat 92.

Figure 5:
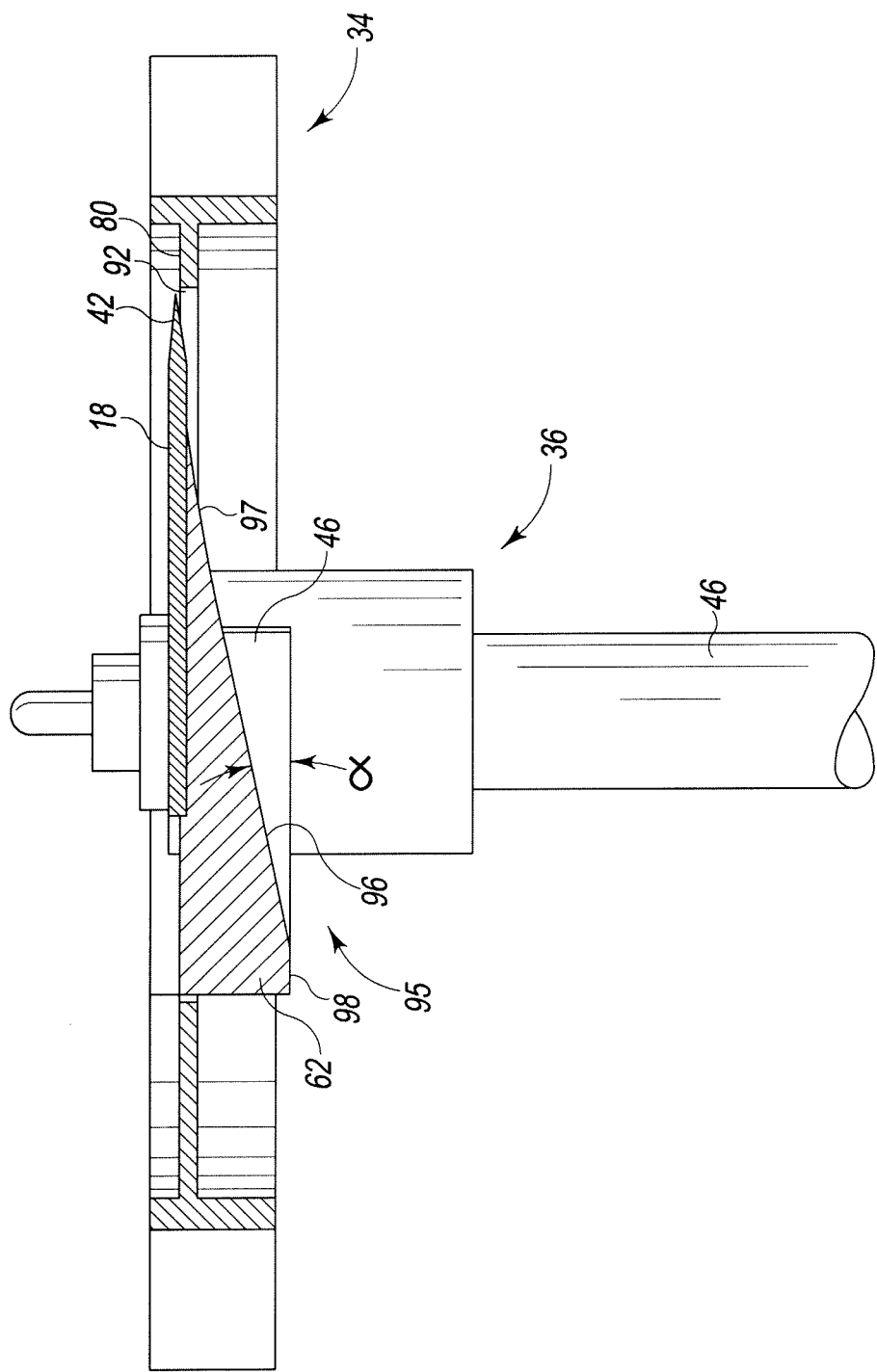
FIG. 5 is a partial cross sectional view of the food slicer assembly of FIG. 2 taken along the line 5-5 shown in FIG. 4.

As best seen in FIG. 5, the mounting arm 62 has a ramp 95 defined therein, which guides food items from the throat 92 into the lower compartment 40 of the bowl 22. The surface 96 of the ramp 95 is sloped downward from an upper end 97 positioned adjacent to the cutting edge 42 to a lower end 98. As shown in FIGS. 2 and 3, the surface 96 extends radially outward from the central shaft 46 to the end 64 of the mounting arm 62. The angle of inclination or slope of the surface 96 changes along the radially length of the surface 96, increasing from approximately 15 degrees at the end 64 to approximately 25 degrees near the central shaft 46. As shown in FIG. 5, the surface 96 has an angle of inclination α of approximately 22 degrees. In other embodiments, the surface 96 may be convex or concave in one or more directions. The central shaft 46 and the end 64 of the mounting arm 62 act as sidewalls for the surface 96 such that food items entering the throat 92 are guided down the ramp 95. In that way, the surface 96 is encapsulated or captured, thereby reducing the potential for food items to travel outside of the processing path and thus reducing unwanted debris.

A rim 90 extends upwardly from the outer perimeter of the disk's planar body 80. The rotating disk 34 has a diameter that is slightly less than the inner diameter of the bowl 22 such that the rim 90 is positioned adjacent to, but spaced slightly apart from, the inner wall of the bowl to permit rotation of the disk 34 within the bowl 22. The rotating disk 34 also includes a blade support 100 pivotably coupled to the rim 90.

Figure 6:
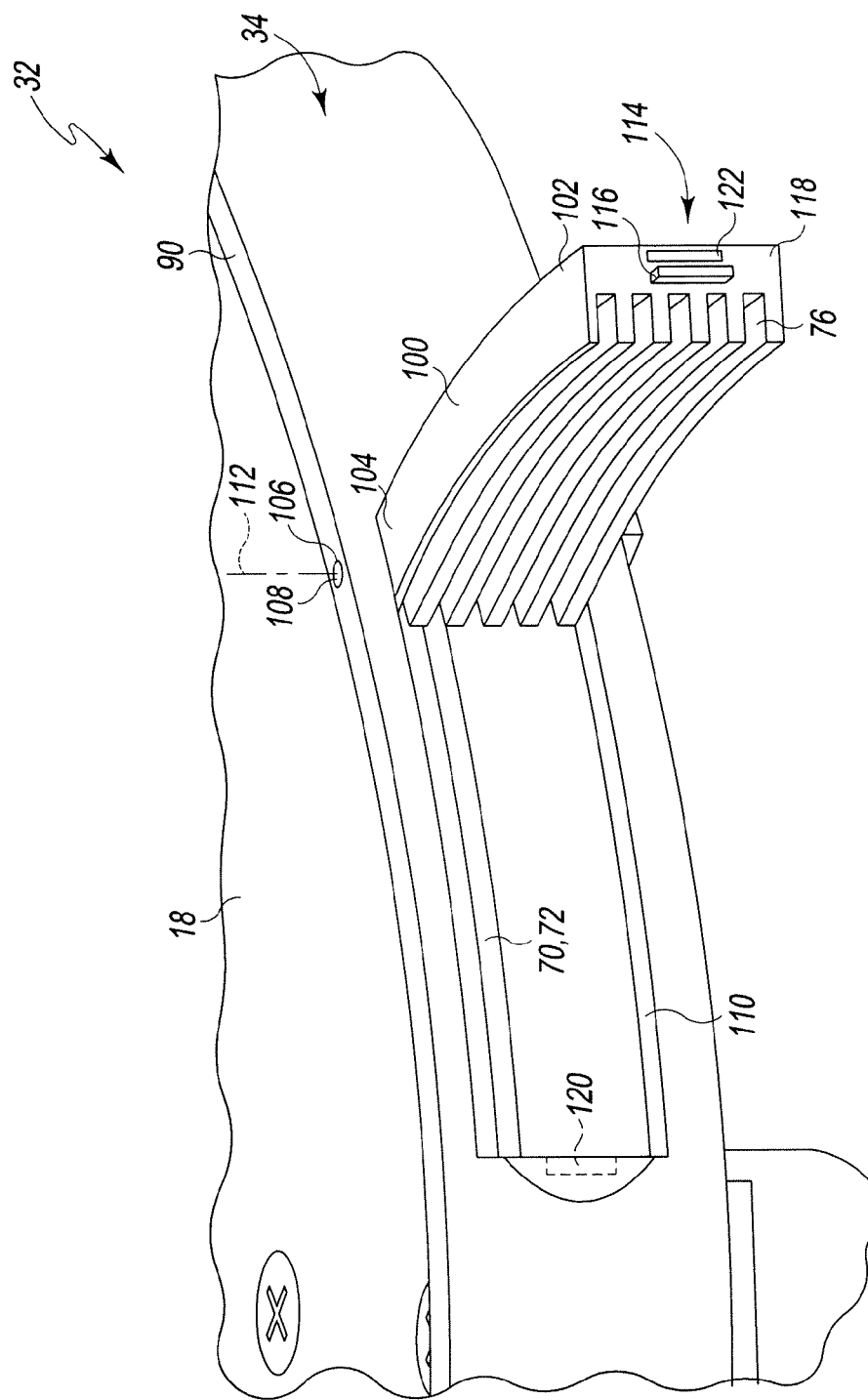
FIG. 6 is a fragmentary perspective view of a blade support of the food slicer assembly of FIG. 2.

As best seen in FIG. 6, the blade support 100 has the plurality of slots 76 formed therein. Each of the slots 76 extends parallel to the outer edge 72 of the cutting blade 18, and each of the slots 76 is sized to receive one of the flanges 70. In the illustrative embodiment, five slots 76 are formed in the blade support 100, and the slots 76 are spaced apart from each other by two millimeters. It will be appreciated that in other embodiments the blade support 100 may include additional or fewer slots and the spacing between the slots may be adjusted.

The blade support 100 has a body 102 extending from an end 104 hinged to the rim 90 at a pivot joint 106. The pivot joint 106 includes a cylindrical pivot pin 108 that extends through, and is positioned in, the rim 90 and the end 104. It will be appreciated that in other embodiments the pivot pin 108 may be formed as part of the blade support 100. As shown in FIGS. 4 and 6, the blade support 100 pivots relative to the rim 90 about an axis 112 defined by the pivot joint 106 between an engaged position and a disengaged position.

When the blade support 100 is in the engaged position (see FIGS. 2 and 3), one of the flanges 70 of the blade assembly 36 is received in a corresponding slot 76. In the engaged position, the body 102 is fully positioned in an opening 110 formed in the rim 90. When the blade support 100 is pivoted to the disengaged position, the body 102 extends outwardly from the opening 110, as shown in FIG. 6. In the disengaged position, the slots 76 are spaced apart from the flanges 70 of the blade assembly 36.

The rotating disk 34 includes a locking device 114 that secures the blade support 100 in the engaged position. In the illustrative embodiment, the locking device 114 includes a rectangular tab 116 extending from an end 118 of the body 102. When the blade support 100 is in the engaged position, the tab 116 is received in a recess 120 formed in the rim 90. Another recess 122 formed in the end 118 of the body 102 permits a user to apply sufficient force to release the blade support 100. It will be appreciated that in other embodiments the locking device 114 may take the form of a latch, pin, or other mechanism configured to maintain the blade support 100 in the engaged position.

As discussed above, the rotating disk 34 is moveable upwardly and downwardly between a plurality of cutting positions relative to the cutting blade 18. As shown in FIG. 2, in one cutting position of the rotating disk 34, the outer edge 72 of the cutting blade 18 is received in the upper slot 124 of the blade support 100. In another cutting position, the lip 74 of the mounting arm 62 is received in the upper slot 124 of the blade support 100. In other cutting positions, the lip 74 may be positioned in any of the other slots 76 of the blade support 100. It will be appreciated that in other embodiments both flanges 70 of the blade assembly 36 may be received in slots 76 of the rotating disk 34. Additionally, in other embodiments, the blade assembly 36 may include only a single flange 70, such as, for example, the outer edge 72 of the cutting blade, which is received in a slot 76 at each of the cutting positions. In addition to providing support to the cutting blade 18, the engagement of one of the flanges 70 with one of the slots 76 inhibits or prevents the upward and downward movement of the rotating disk 34 when the blade support 100 is in the engaged position.

As shown in FIGS. 2 and 3, the food slicer assembly 32 includes a separate locking mechanism 130 positioned below the lower surface 84 of the rotating disk 34 that is configured to prevent the upward and downward movement of the rotating disk 34. In that way, the rotating disk 34 can be locked at one cutting position relative to the cutting blade 18. In the illustrative embodiment, the locking mechanism 130 is also configured to prevent the blade assembly 36 from rotating relative to the rotating disk 34.

As shown in FIGS. 2 and 3, the locking mechanism 130 includes a user-operated pin 132. The term "user-operated pin" as used herein refers to a pin that is manually operated by the user without the use of a tool. This is distinct from, and in contrast to, a set screw, hex bolt, or other fastener that is operated by the user through the use of a wrench, screw driver, or other tool. The user-operated pin 132 includes an elongated shaft 134 extending from an end 136 positioned outside of the sleeve 82 to an end 138 positioned in an aperture 140 defined in the central shaft 46. A button-head 142 sized to receive a finger of a user is formed at the end 136 of the shaft 134. The outer surface 144 of the shaft 134 includes a smooth section 146 and another section having a plurality of teeth 148 extending therefrom.

The shaft 134 of the user-operated pin 132 extends through a vertically-extending slot 150 defined in the sidewall 94 of the sleeve 82. The sidewall 94 includes a plurality of teeth 152 that extend into the slot 150. As indicated by arrow 154 in FIG. 2, the shaft 134 is moveable between a locked position, in which the teeth 148 of the shaft 134 interdigitate or engage with a number of the teeth 152 of the sidewall 94, and an unlocked position, in which the teeth 148 of the user-operated pin are spaced apart from the teeth 152 of the sleeve. In the locked position, the rotating disk 34 is prevented from moving upward and downward relative to the cutting blade 18. It will be appreciated that in other embodiments the central shaft 46 may have a number of teeth configured to engage with the teeth 148 of the user-operated pin 132. It will also be appreciated that in other embodiments the user-operated pin 132, central shaft 46, and sleeve 82 may have any combination of slots, grooves, flanges, or other structures suitable for locking the rotating disk 34 in position relative to the cutting blade 18.

As shown in FIGS. 2 and 3, the aperture 140 defined in the central shaft 46 extends inwardly to a bottom 160. A cylindrical guide pin 162 is positioned in an opening 164 formed at the bottom 160 of the aperture 140 and extends away from the bottom 160 to an end. A spring 168 extends over the guide pin 162 is coupled at a spring end 170 to the end 138 of the user-operated pin 132. It will be appreciated that in other embodiments the guide pin 162 may take the form of a cross, hexagon, or other shape to provide guidance and stability to the spring 168. The spring 168 biases the user-operated pin 132 away from the bottom 160 of the aperture 140 thereby engaging the teeth 148 of the user-operated pin with the teeth 152 of the sleeve.

To change the distance D between the cutting edge 42 of the cutting blade 18 and the upper surface 44 of the rotating disk 34, the user unlocks the blade support 100 from the rim 90 and pivots the blade support 100 about the axis 112 from the engaged position to the disengaged position. The user then presses the button-head 142 to depress the user-operated pin 132. The spring 168 is compressed and the teeth 148 are moved out of contact with the teeth 152 of the sleeve 82. When the teeth 148 of the user-operated pin are spaced apart from the teeth 152 of the sleeve, the user may slide the rotating disk 34 upwardly or downwardly to another cutting position.

Once the rotating disk 34 is at the desired cutting position, the user releases the button-head 142, and the spring 168 urges the user-operated pin 132 away from the bottom 160 of the aperture 140, thereby reengaging the teeth 148 with the teeth 152 and locking the rotating disk 34 into the desired cutting position. The user pivots the blade support 100 from the disengaged position back to the engaged position, thereby preventing substantial deflection of the cutting blade 18 and providing an additional locking feature to prevent the upward/downward movement of the rotating disk 34 relative to the cutting blade 18.

It will be appreciated that in other embodiments the slicer assembly 32 may not include the blade support 100. In such embodiments, changing the distance D between the cutting edge 42 of the cutting blade 18 and the upper surface 44 of the rotating disk 34 would involve operating only the user-operated pin 132 of the locking mechanism 130. Similarly, in other embodiments including the blade support 100, the locking mechanism 130 may be omitted and replaced with a different thickness adjustment assembly operable by a user to vary the cutting thickness of the food processor 10. In those embodiments, changing the distance D between the cutting edge 42 of the cutting blade 18 and the upper surface 44 of the rotating disk 34 would involve, first, moving the blade support 100 to the disengaged position, which would release the rotating disk 34 for upward and downward movement, and, second, operating the thickness adjustment assembly.

Figure 7:
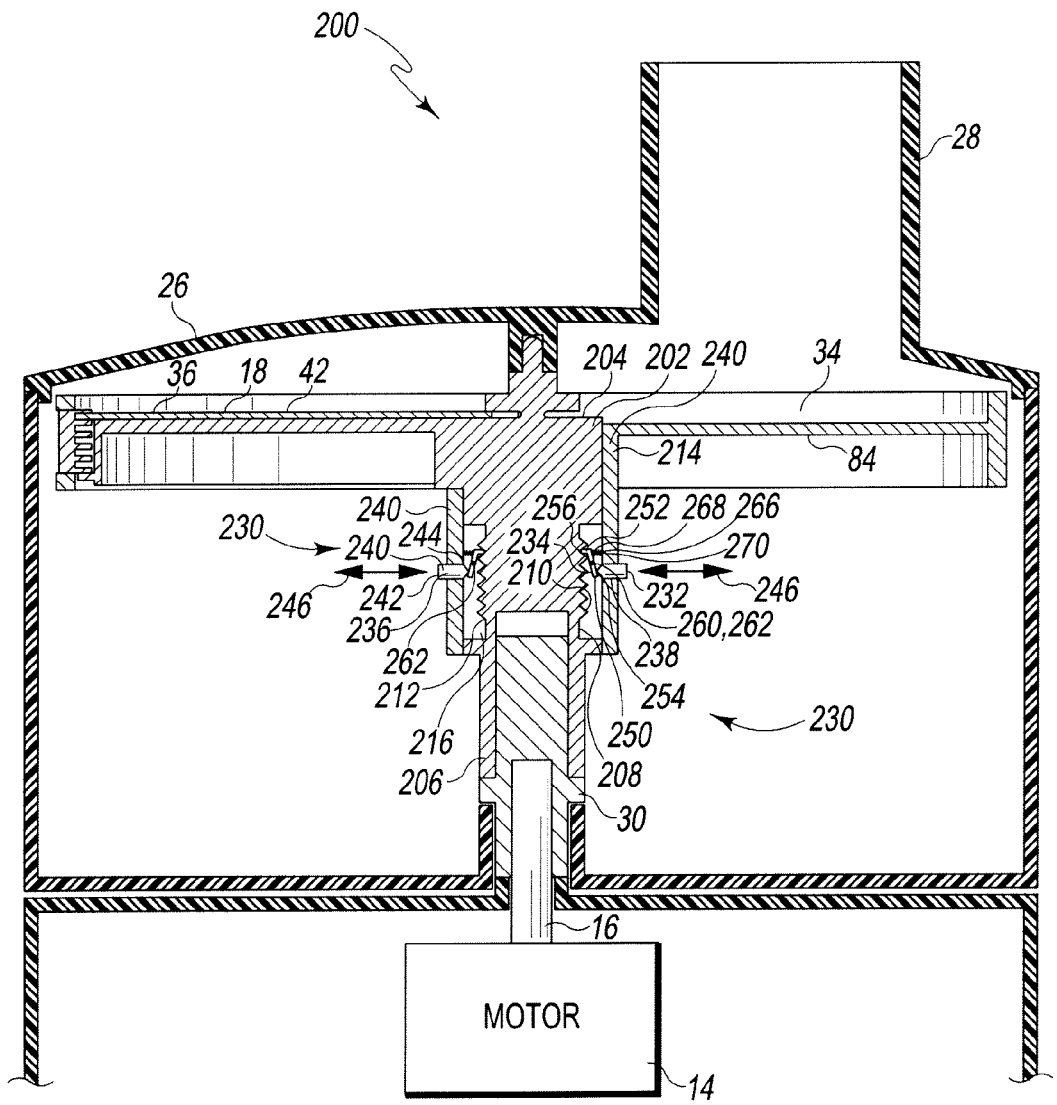
FIG. 7 is a partial cross sectional view of another embodiment of a food processor.
Figure 8:
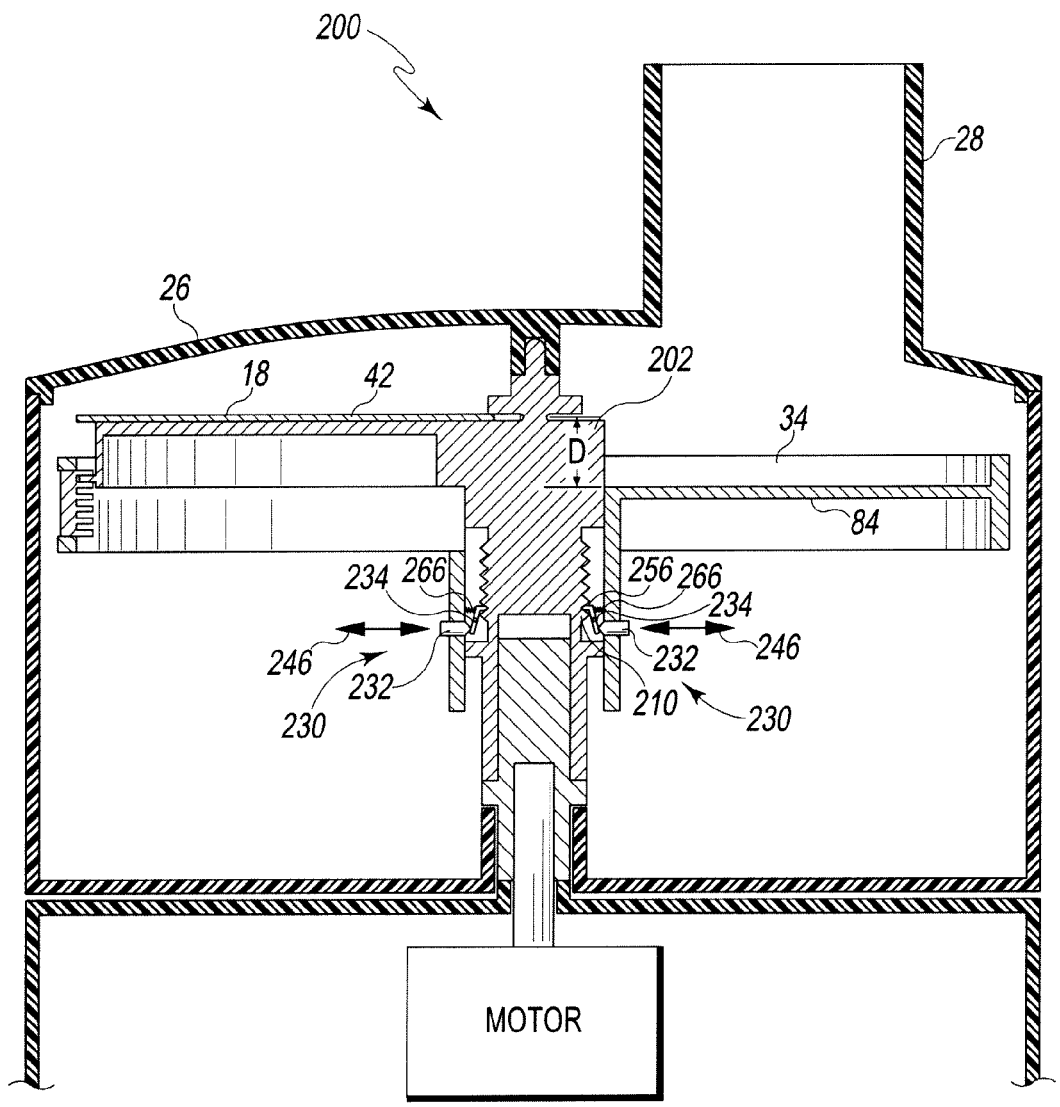
FIG. 8 is a view similar to FIG. 7, showing the rotating disk of the food slicer assembly of FIG. 7 in another position relative to the cutting blade.

Referring now to FIGS. 7 and 8, another embodiment of a food slicer assembly is shown in a food processor. Many of the components of the food processor of FIGS. 7 and 8 are common with the components of the food processor of FIGS. 1-6. Such common components have common reference numerals. The food processor of FIGS. 7 and 8 is essentially the same as the food processor of FIGS. 1-6 except that the food slicer assembly (hereinafter food slicer assembly 200) includes a different locking mechanism to prevent the upward and downward movement rotating disk 34 relative to the cutting blade 18.

The slicer assembly 200, like the slicer assembly 32 described above in reference to FIGS. 1-6, includes a blade assembly 36 and a rotating disk 34. In addition to the cutting blade 18, the blade assembly 36 includes a central shaft 202 extending from an upper end 204 to a lower end 206. The lower end 206 receives the drive stem 30, thereby coupling the slicer assembly 200 to the motor 14. As shown in FIGS. 7 and 8, one section 208 of central shaft 202 has a plurality of teeth 210 extending outwardly from an outer surface 212 thereof.

The rotating disk 34 includes a central sleeve 214 extending downwardly from a lower surface 84 thereof. A passageway 216 extends through the sleeve 214 and receives the central shaft 202 of the blade assembly 36. Similar to the locking mechanism 130 described above in reference to FIGS. 1-6, a pair of locking mechanisms 230 are positioned below the lower surface 84 of the rotating disk 34.

Each locking mechanism 230 includes a user-operated pin 232 and a lever 234 coupled thereto. The user-operated pin 232 includes a shaft 236 that is positioned in a through-hole 238 formed in a sidewall 240 of the sleeve 214. The shaft 236 extends from an end 242 positioned outside of the sleeve 214 to an end 244 positioned in the passageway 216. The user-operated pin 232 moves back and forth within the through-hole 238, as indicated by arrow 246, between a locked position and an unlocked position.

The lever 234 is positioned within the passageway 216 and is pivotably coupled to the sidewall 240 of the sleeve 214. The lever 234 has a lever body 250 that extends from an upper end 252 to a lower end 254. The upper end 252 of lever body 250 includes a tip 256 that is sized to engage with the teeth 210 formed on the central shaft 202. The lower end 254 is coupled to the end 244 of the user-operated pin 232. As shown in FIGS. 7 and 8, the ends 244, 254 are in contact but are not fixed to each other. It will be appreciated that in other embodiments the ends 244, 254 may be pivotably fastened together.

The lever body 250 is pivotably coupled to the sidewall 240 at a pivot joint 260. The pivot joint 260 includes a cylindrical pivot pin 262 that extends through lever body 250 and the sidewall 240. The lever body 250 pivots about an axis defined by the pivot joint 260 between an engaged position and a disengaged position. In the engaged position, the tip 256 of the lever 234 is engaged with a number of the teeth 210 of the central shaft 202. When the lever 234 is in the engaged position, the rotating disk 34 is prevented from moving relative to the cutting blade 18. In the disengaged position, the tip 256 of the lever is spaced apart from the teeth 210 of the central shaft 202 such that the lever 234 does not prevent the rotating disk 34 from being moved to another cutting position.

A spring 266 is positioned in the passageway 216 of the sleeve 214 and is coupled to the upper end 252 of the lever body 250. The spring 266 extends from a spring end 268 coupled to the lever body 250 to a spring end 270 coupled to the sidewall 240 of the sleeve 214. The spring 266 biases the upper end 252 of the lever 234 toward the central shaft 202 thereby engaging the tip 256 with the teeth 210 of the central shaft 202.

When the user depresses the user-operated pin 232 of each locking mechanism 230, the user-operated pin 232 is moved from the locked position to the unlocked position. The shaft 236 of the user-operated pin 232 acts on the lower end 254 of the lever 234, thereby causing the lever 234 to pivot from the engaged position to the disengaged position. As the upper end 252 moves away from the central shaft 202, the spring 266 is compressed. Thus, when the user-operated pin 232 is in the unlocked position, the lever 234 is in the disengaged position.

When the user releases the user-operated pin 232, the spring 266 urges the upper end 252 toward the central shaft 202 thereby re-engaging the tip 256 with the teeth 210. As the lever 234 moves back to the engaged position, the lever body 250 urges the user-operated pin 232 back to the locked position.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, while food processor 10 is herein illustrated as a conventional domestic food processor, the features and aspects disclosed herein can also be implemented in other types of food processing devices such as automatic food slicers, dicers, ice shavers and the like. Similarly, the blade support could be removable from the rotating disk 34 instead of being pivotably coupled to the rim. Additionally, the rotating disk could be directly coupled to motor, and the blade could be moveable relative to the rotating disk.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A food processor comprising:
a base having a motor positioned therein,
a removable bowl coupled to the base,
a removable lid coupled to the bowl, the lid having a feed tube that opens into the bowl,
a cutting blade, including a central shaft, positioned in the bowl and driven by the motor to cut food items advanced through the feed tube,
a rotating disk having a sleeve extending downwardly from a lower surface of the rotating disk and upwardly and downwardly moveable along the central shaft relative to the cutting blade to adjust the distance therebetween,
a user-operated pin positioned substantially horizontally below the rotating disk and having a pin body extending from a first end through a sidewall of the sleeve having a first plurality of teeth to a second end disposed in an aperture formed in the central shaft, the user-operated pin being moveable between (i) a first position in which the rotating disk is prevented from moving upwardly and downwardly relative to the cutting blade, and (ii) a second position in which the rotating disk is permitted to move upwardly and downwardly relative to the cutting blade; and
an outer surface of the pin body including a second plurality of teeth extending therefrom, at least one of the first plurality of teeth engaging the second plurality of teeth when the user-operated pin is in the first position.

2. The food processor of claim 1, wherein the first plurality of teeth are spaced apart from the second plurality of teeth when the user-operated pin is moved to the second position.

3. The food processor of claim 1, further comprising:
a spring having a first spring end positioned at a bottom of the aperture of the central shaft and a second spring end coupled to the second end of the user-operated pin, wherein the spring biases the user-operated pin in the first position.

4. The food processor of claim 3, wherein a guide pin extends outwardly from the bottom of the aperture, and the spring extends over the guide pin.

5. The food processor of claim 1, further comprising:
a lever pivotably coupled to the sidewall of the sleeve and having a first lever end contacting the second end of the user-operated pin,
wherein movement of the user-operated pin between the first position and the second position causes the lever to pivot about an axis between a first lever position and a second lever position.

6. The food processor of claim 5, wherein the lever extends from the first lever end to a second lever end, the second lever end being coupled with the central shaft when the lever is at the first lever position.

7. The food processor of claim 6, further comprising:
a spring having a first end coupled to a sidewall of the sleeve and a second end coupled to the second lever end, wherein the spring biases the lever in the first lever position, thereby maintaining the user-operated pin in the first position and preventing movement of the rotating disk relative to the cutting blade.

8. The food processor of claim 6, wherein the central shaft has an outer surface with a plurality of teeth extending therefrom, and the second lever end is engaged with a number of the plurality of teeth when the lever is at the first lever position, thereby preventing the rotating disk from moving relative to the cutting blade.

9. The food processor of claim 8, wherein the second lever end is spaced apart from the plurality of teeth at the second lever position, thereby permitting movement of the rotating disk relative to the cutting blade.

10. The food processor of claim 1, wherein a button is secured to a first end of the user-operated pin, and depressing the button moves the user-operated pin from the first position to the second position.

* * * * *